United States Patent

[11] 3,618,721

[72] Inventor Richard C. Hare
Box 33, Whitinsville, Mass. 01588
[21] Appl. No. 66,332
[22] Filed Aug. 24, 1970
[45] Patented Nov. 9, 1971

[54] ONE-WAY CLUTCH
6 Claims, 2 Drawing Figs.

[52] U.S. Cl............................................ 192/35,
192/41 S
[51] Int. Cl...................................... F16d 41/20
[50] Field of Search........................... 192/35, 36,
41 S, 56 C, 12 BA; 188/77 W, 82.6

[56] References Cited
UNITED STATES PATENTS
1,940,880  12/1933  Pitter............................ 192/41 S
2,633,953  4/1953  Gorske......................... 192/41 S X
3,302,762  2/1967  Conlon......................... 192/41 S X Primary Examiner—Allan D. Herrmann
Attorney—Bryan, Parmelee, Johnson & Bollinger ABSTRACT: A one-way clutch of the clutch spring type for transmitting rotational movement from a driving member to a driven member, with the driven member free to rotate in either direction when the clutch is disengaged. The clutch has the driven member in the form of a shaft rotatably carrying the driving member and an axially spaced rotatable bushing member, with the clutch spring therebetween, encircling the driven member and connected at its ends to the driving member and bushing member. Axially spaced from the bushing member and also rotatably carried by the driven member shaft is a member fixed against rotation. A compression spring, e.g., a coil spring, encircles the driven member shaft between the fixed member and bushing member and urges them axially apart, the compression spring providing a torsional drag on the bushing member to cause the clutch spring to contract to engage the driven member when the driving member is rotated relative thereto. The compression spring further provides an axial force on the bushing member and fixed member to hold the clutch parts in spring loaded position. In the preferred construction, the compression spring is functionally secured to the fixed member and bears against a thrust washer in engagement with the bushing member, which is made of a bearing material which freely slides against the thrust washer; the driving member has a hub of diameter slightly larger than the inside diameter of the relaxed clutch spring; and the driven member has a hub with a diameter slightly less than the relaxed clutch spring inside diameter.

PATENTED NOV 9 1971
3,618,721
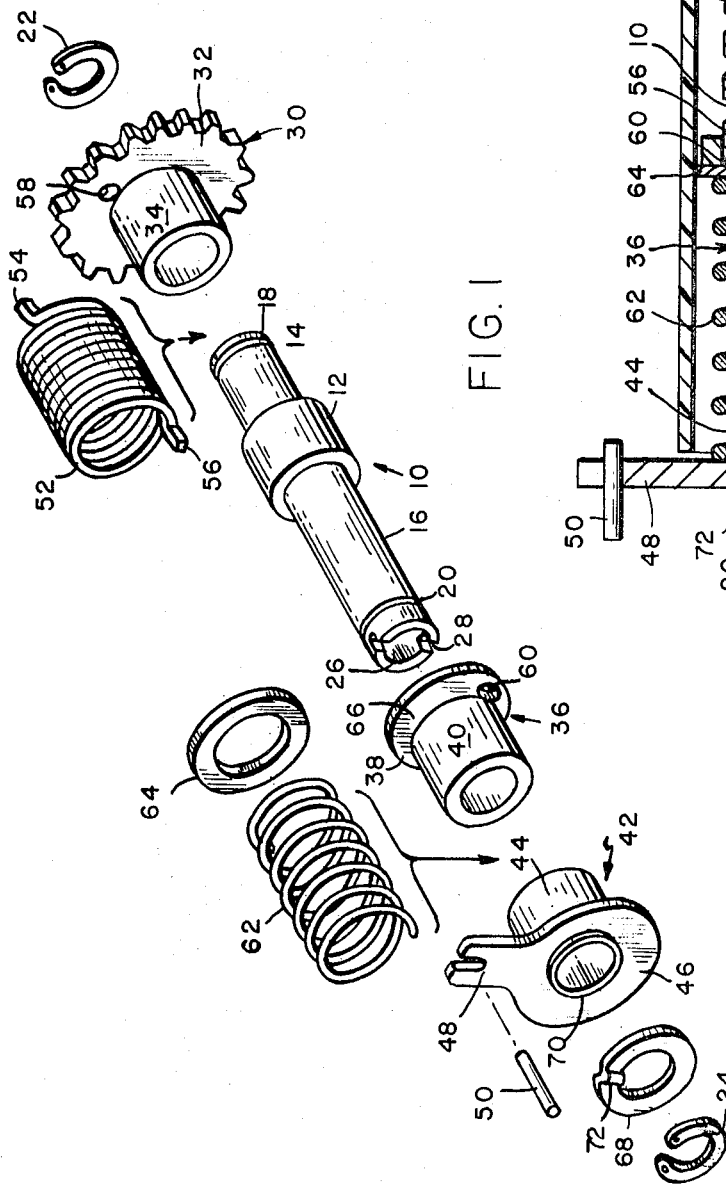
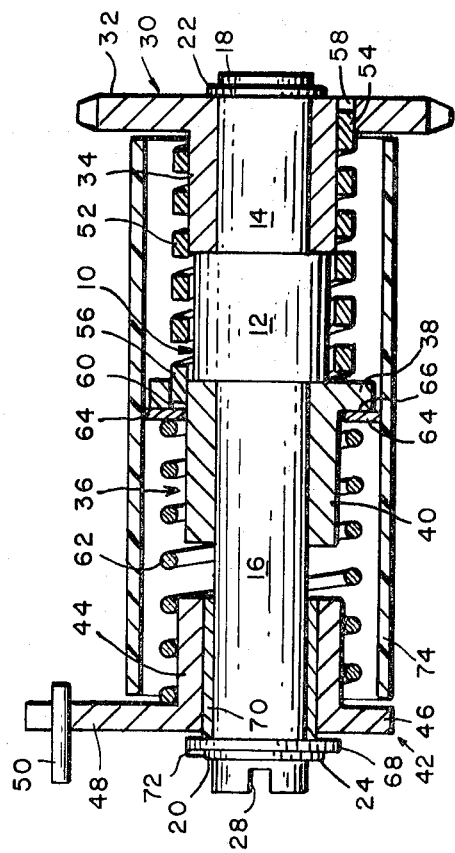
INVENTOR
RICHARD C. HARE
BY Roberts, Cushman & Grover
ATTYS

ONE-WAY CLUTCH

BACKGROUND OF THE INVENTION

The field of the present invention relates to mechanical clutch units for transmitting rotary motion, and more particularly to clutch units of the type employing a coil spring which is contracted by relative rotation of its ends to establish clutching engagement between driving and driven members, the driven member being free to rotate in either direction when the clutch is disengaged.

One way clutches employing clutch springs and having driven members freely rotatable upon disengagement are well known, examples being illustrated in the U.S. Pat. to Smith No. 2,915,158, Summer (British) Pat. No. 120,474, Harlan U.S. Pat. No. 2,551,739, Collyear U.S. Pat. No. 2,044,420, and Morse U.S. Pat No. 3,354,995. Despite the profusion of clutches of this type, they are characterized by complex construction, and an inability to achieve a positive clutch engagement and disengagement, uneven wear, and unreliable operation over a long period of time.

SUMMARY OF THE INVENTION

Objects of the present invention are to provide a one way clutch of the type utilizing a clutch spring and having a driven member freely rotatable when the clutch is disengaged, which is simple in construction, provides positive and accurate clutch engagement and disengagement, and which is economical to make and reliable in use.

According to the invention, the one way clutch comprises a driving member, a driven member, and a rotatable member in coaxial alignment. A clutch spring is connected at one end to said driving member and at the other end to said rotatable member, and surrounds said driven member. Spaced axially from the rotatable member is a fixed member, and between the fixed and rotatable members there is mounted an axial compression spring urging said fixed and rotatable members apart and urging the rotatable member toward said driving member, the compression spring furnishing torsional drag to the rotatable member to tighten the clutch spring when the driving member is rotated relatively thereto, the torsional drag also tending to declutch the clutch spring when the driving member is slowed to produce a reverse relative rotation. The driven member is a shaft which rotatably mounts the driving member, rotatable member, and fixed member, with the driving member having a hub slightly larger than the inside diameter of the relaxed clutch spring and the driven member having a hub diameter slightly less than the clutch spring inside diameter. It is preferable that the rotatable member have a radial flange forming a bearing surface, and that the compression spring and rotatable member have a thrust washer inserted therebetween which slides against said bearing surface, the compression spring remaining fixed by a frictional fit over a hub on the fixed member.

These and other objects and novel aspects of the invention will be apparent from the following description of a preferred embodiment thereof.

DESCRIPTION OF THE DRAWINGS

FIG. 1 is an exploded view of a clutch according to the invention; and

FIG. 2 is an axial section of the clutch of FIG. 1, assembled.

DESCRIPTION OF THE PREFERRED EMBODIMENT

The one-way clutch illustrated in the drawing comprises a driven member 10 having a central enlarged hub portion 12 and two end bearing portions 14 and 16 with annular grooves 18 and 20 at the ends thereof to receive snap retainer rings 22 and 24. As illustrated, the driven member 10 has a longitudinal bore 26 to receive a shaft (not shown) which is pinned to driven member 10 through an end slot 28 provided therein.

A driving member 30 having a hub portion 34 connected to a sprocket wheel 32 to receive transmitted power is rotatably mounted on driven member bearing portion 14 and held there by snap ring 22. Mounted on the other bearing portion 16 of the driven member 10 are a rotatable bushing member 36 having a radial flange 38 extending from hub portion 40, and a fixed member 42 having a hub portion 44 riding on bearing portion 16 and a radial flange 46 with an arresting arm 48 extending therefrom which is secured by means of a pin 50 to a frame member or other immobile part of the machinery (not shown) in which this clutch unit is used.

A clutch spring 52 encircles driving member hub 34 and driven member hub 12, and is secured at its ends to driving member 30 and rotatable bushing member 36 by means of end tangs 54 and 56 which are received respectively in hole 58 in driving member 30 and milled slot or hole 60 in bushing member 36. As illustrated, the hub 34 of driving member 30 is made of greater diameter than the hub 12 of driven member 10, and, although it cannot be illustrated, the inside diameter of clutch spring 52, in its relaxed state, has a diameter smaller than that of hub 34 but larger than that of hub 12. Thus, clutch spring 52 is carried with a slight declutching bias which assists in disengaging the clutch when no driving force is present.

As is well known, a one-way clutch utilizing a clutch spring is engaged by rotating its ends relatively to one another in the direction to tighten it about the driving and driven members until both are in frictional engagement with the clutch spring and thus locked together. In the illustrated clutch, the clutch spring 52 is tightened when driving member 30 is rotated relatively to bushing member 36. It can be appreciated that unless there is some torsional retarding force on the bushing member 36, it will tend to rotate along with clutch spring 52 and driving member 30 to prevent engagement of the clutch. In the present invention, a torsional drag is supplied to bushing member 36 by means of a compression spring 62 which loosely encircles hub 40 of bushing member 36 and which frictionally grips encircled hub 44 of fixed member 42, the spring 62 pushing axially against flanges 38 and 46. As illustrated, a thrust washer 64, fitting freely over hub 40, is interposed between compression spring 62 and flange 38. The surface 66 of flange 38 which contacts thrust washer 64 is a bearing surface preferably provided by making the bushing member 36 of powdered, sintered bronze, which is porous and contains oil, to provide fairly permanent lubrication. The compression spring 62 and thrust washer 64 thus remain stationary, and do not rotate with bushing member 36.

The axial thrust of compression spring 62 pushes fixed member 42 against another thrust washer 68 interposed between fixed member flange 46 and snap ring 24. A cylindrical bushing 70, also preferably made of powdered, sintered bronze containing oil, fits within hub 44 and as shown extends outwardly of flange 48 and contacts thrust washer 68 to provide a lubricated bearing surface where relative motion takes place between fixed member 42 and thrust washer 68. To insure that thrust washer 68 will rotate along with driven member 10, a small crimp 72 is put in thrust washer 68 so that it will frictionally engage snap ring 24, which is held against rotation in groove 20 by the axial force of compression spring 62.

Thrust washer 64, as shown in FIG. 2, has an outside diameter which is larger than that of flange 38 of bushing member 36. Secured by a press fit over thrust washer 64 is a cylindrical dust cover 74, made of plastic or metal, which encircles the operative parts of the clutch between sprocket wheel 32 and fixed member flange 46.

Operation of the clutch can now be easily explained. With clutch spring 52 relaxed and out of contact with hub 12 of driven member 10, the driven member is free to rotate in either direction. The clutch is engaged by rotating driving member 30 in the direction which tightens clutch spring 52, the torsional drag exerted by compression spring 62 on bushing member 36 causing the clutch spring 52 to tighten as the driving member 30 is rotated. When the clutch is engaged, driving member 30, clutch spring 52, bushing member 36, and driven member 10 with thrust washer 68 and snap ring 24 all rotate together, and the external power supplied to driving member 30 is transmitted to driven member 10. Thrust washer 64, compression spring 62 and fixed member 42 remain stationary, relative motion occuring only at the bearing surfaces where thrust washer 64 meets lubricated surface 66, and where bearing portion 16 and thrust washer 68 meet lubricated bushing 70. When relative rotation of driving member 30 ceases with respect to bushing member 36, the clutch spring relaxes and the clutch is disengaged automatically.

The system of torsional drag provided by axial compression spring 62 acting through thrust washer 64 clean cut bearing surface 66 of bushing member 36, and through thrust washer 68 on lubricated bushing 70, two other favorable characteristics: First, the effects of wear on the drag means are minimized, leading to longer maintenance free clutch life, as a durable bearing can be provided to handle all the frictional movement taking place perpendicular to the axial thrust of the compression spring. Second, the axial thrust of compression spring 62 maintains the clutch parts in a spring-loaded position against end stops provided by snap rings or hub enlargements, thus reducing vibration and rattles without need for extremely low tolerances.

Clutches made according to the description above have several advantages. First, automatic clutching and declutching are clean cut and positive. Second, frictional areas are minimized to reduce needed bearing surfaces. Third, the clutch has few wearing parts and thus it is very durable. Fourth, the clutch is extremely compact and simple in design, enabling it to be manufactured inexpensively.

It should be understood that the foregoing description is for the purpose of illustration and that this invention includes all modifications falling within the scope of the appended claims.

I claim:

1. A one-way clutch comprising
    a driving member;
    a driven member;
    a rotatable member coaxial with said driving and driven members and having a radial flange with a bearing surface;
    a clutch spring encircling said driven member and having its ends connected respectively to said driving member and rotatable member;
    a fixed member spaced axially from said rotatable member;
    an axial compression spring between said fixed and rotatable members and urging them apart, said compression spring being stationary relative to said fixed member and urging said rotatable member toward said driving member, thereby to furnish torsional drag to said rotatable member to tighten said clutch spring upon relative rotation of said driven member; and
    a thrust washer interposed between said compression spring and said flange bearing surface, said thrust washer being stationary relative to said fixed member and compression spring.

2. A one-way clutch according to claim 1 wherein said driving member comprises a hub having a diameter greater than the inside diameter of said clutch spring when relaxed, and wherein said driven member has a hub portion for engagement with said clutch spring having a diameter less than the inside diameter of said relaxed clutch spring.

3. A one-way clutch according to claim 1 wherein said fixed member has a hub of a diameter larger than the inside diameter of said compression spring, and wherein said compression spring is positioned over said fixed member hub and held stationary thereby.

4. A one-way clutch comprising:
    a driven portion having an enlarged hub between axial bearing portions;
    a driving portion mounted upon one of said bearing portions and having a hub adjacent said driven portion hub;
    a rotatable member mounted on the other of said bearing portions and having a hub and a radial flange extending therefrom adjacent said driven member hub;
    a fixed member mounted on the same bearing portion as said rotatable member, said fixed member having a hub portion and a radial flange portion with means for securing said fixed member against rotation;
    a clutch spring encircling said driven member hub and said driving member hub and having its ends secured to said driving member and rotatable member respectively;
    an axial compression spring encircling said rotatable member hub and fixed member hub and urging the flanges of said rotatable member and fixed member apart, said compression spring being frictionally engaged with said fixed member hub;
    a stationary thrust washer interposed between said compression spring and rotatable member radial flange; and
    retainer means on said driven member for holding said driving member, rotatable member, and fixed member in axial relation.

5. A one-way clutch according to claim 4 further comprising a cylindrical dust cover coaxial with said driven member and mounted on the outer periphery of said thrust washer, the diameter of said thrust washer being greater than the diameter of said rotatable member radial flange.

6. A one-way clutch according to claim 4 further comprising a bearing means carried by said fixed member axially opposite said compression spring, and a thrust washer disposed between said bearing means and said retainer means, said thrust washer being provided with means fixing it against rotation with respect to said retainer means.

* * * * *